United States Patent
Berger et al.

(10) Patent No.: US 10,365,179 B2
(45) Date of Patent: Jul. 30, 2019

(54) METHOD AND DEVICE FOR TESTING THE TIGHTNESS OF LARGE-VOLUME CONTAINERS

(71) Applicant: KHS GmbH, Dortmund (DE)

(72) Inventors: Thomas Berger, Glashütten (DE); Benedikt Freiherr Von Fürstenberg, Renchen-Ulm (DE)

(73) Assignee: KHS GmbH, Dortmund (DE)

( * ) Notice: Subject to any disclaimer, the term of this patent is extended or adjusted under 35 U.S.C. 154(b) by 151 days.

(21) Appl. No.: 14/785,710

(22) PCT Filed: Mar. 7, 2014

(86) PCT No.: PCT/EP2014/000590
§ 371 (c)(1),
(2) Date: Oct. 20, 2015

(87) PCT Pub. No.: WO2014/173479
PCT Pub. Date: Oct. 30, 2014

(65) Prior Publication Data
US 2016/0069770 A1     Mar. 10, 2016

(30) Foreign Application Priority Data
Apr. 23, 2013 (DE) ................. 10 2013 006 943

(51) Int. Cl.
*G01M 3/10*     (2006.01)
*G01M 3/38*     (2006.01)

(52) U.S. Cl.
CPC ............... *G01M 3/10* (2013.01); *G01M 3/38* (2013.01)

(58) Field of Classification Search
CPC .................................. G01M 3/10; G01M 3/38
USPC .................................................. 73/45.4, 49.2
See application file for complete search history.

(56) References Cited

U.S. PATENT DOCUMENTS 3,683,676 A * 8/1972 Hass ................... G01M 3/3236
73/45.1
3,818,752 A * 6/1974 Lindeberg ........... G01M 3/3254
73/49.2
4,899,574 A * 2/1990 Potteiger ............... G01M 3/366
73/49.3
(Continued)

FOREIGN PATENT DOCUMENTS

DE         38 13 410      11/1989
DE         3813410 A1 *   11/1989       ............... B67C 3/30
(Continued)

*Primary Examiner* — Marrit Eyassu
(74) *Attorney, Agent, or Firm* — Occhiuti & Rohlicek LLP

(57) ABSTRACT

A method for testing tightness of container includes placing a bell-shaped test head over a mouth of the container, sealing the container against the test head, accommodating at least a portion of the container in a testing chamber within the test head, increasing a pressure difference between a pressure within the testing chamber and an internal pressure of the container, identifying evidence of matter exiting the container and entering the testing chamber. Typical evidence includes emergence of filling substance into the testing chamber and/or foaming of the filling substance in the testing chamber. Identifying such evidence includes using a camera to monitor either the region of the container or the test chamber for the evidence.

18 Claims, 1 Drawing Sheet

(56) References Cited

U.S. PATENT DOCUMENTS

| | | | | |
|---|---|---|---|---|
| 5,546,789 A * | 8/1996 | Balke | ................ | G01M 3/3281 |
| | | | | 73/40 |
| 6,167,751 B1 * | 1/2001 | Fraim | ................... | G01M 3/363 |
| | | | | 73/49.3 |
| 6,314,796 B1 * | 11/2001 | Wittekind | ............... | G01M 3/40 |
| | | | | 324/536 |
| 6,701,776 B2 * | 3/2004 | Stetter | ................... | G01M 3/226 |
| | | | | 73/49.2 |
| 7,752,892 B2 * | 7/2010 | Muller | .................. | G01M 3/229 |
| | | | | 73/49.2 |
| 2003/0230135 A1 * | 12/2003 | McCormick | ........ | G01M 3/3209 |
| | | | | 73/49.2 |
| 2004/0129082 A1 * | 7/2004 | Frinking | ................ | A61B 8/481 |
| | | | | 73/590 |
| 2005/0160794 A1 * | 7/2005 | Sonntag | ................. | G01M 3/10 |
| | | | | 73/40 |
| 2005/0268700 A1 * | 12/2005 | Strand | ................... | G01M 3/366 |
| | | | | 73/49.2 |
| 2006/0117837 A1 * | 6/2006 | Voglsinger | .............. | G01M 3/10 |
| | | | | 73/40.7 |

FOREIGN PATENT DOCUMENTS

| | | | | |
|---|---|---|---|---|
| DE | 93 13 923 | 1/1995 | | |
| DE | 10 2008 020273 | 10/2009 | | |
| DE | 10 2008 052 634 | 5/2010 | | |
| DE | 10 2009 039 875 | 3/2011 | | |
| EP | 0 441 632 | 8/1991 | | |
| EP | 0441632 A2 * | 8/1991 | .......... | G01M 3/2876 |
| EP | 0 450 688 | 10/1991 | | |
| EP | 0450688 A1 * | 10/1991 | .......... | G01M 3/3218 |
| JP | 06258175 A * | 9/1994 | | |

* cited by examiner

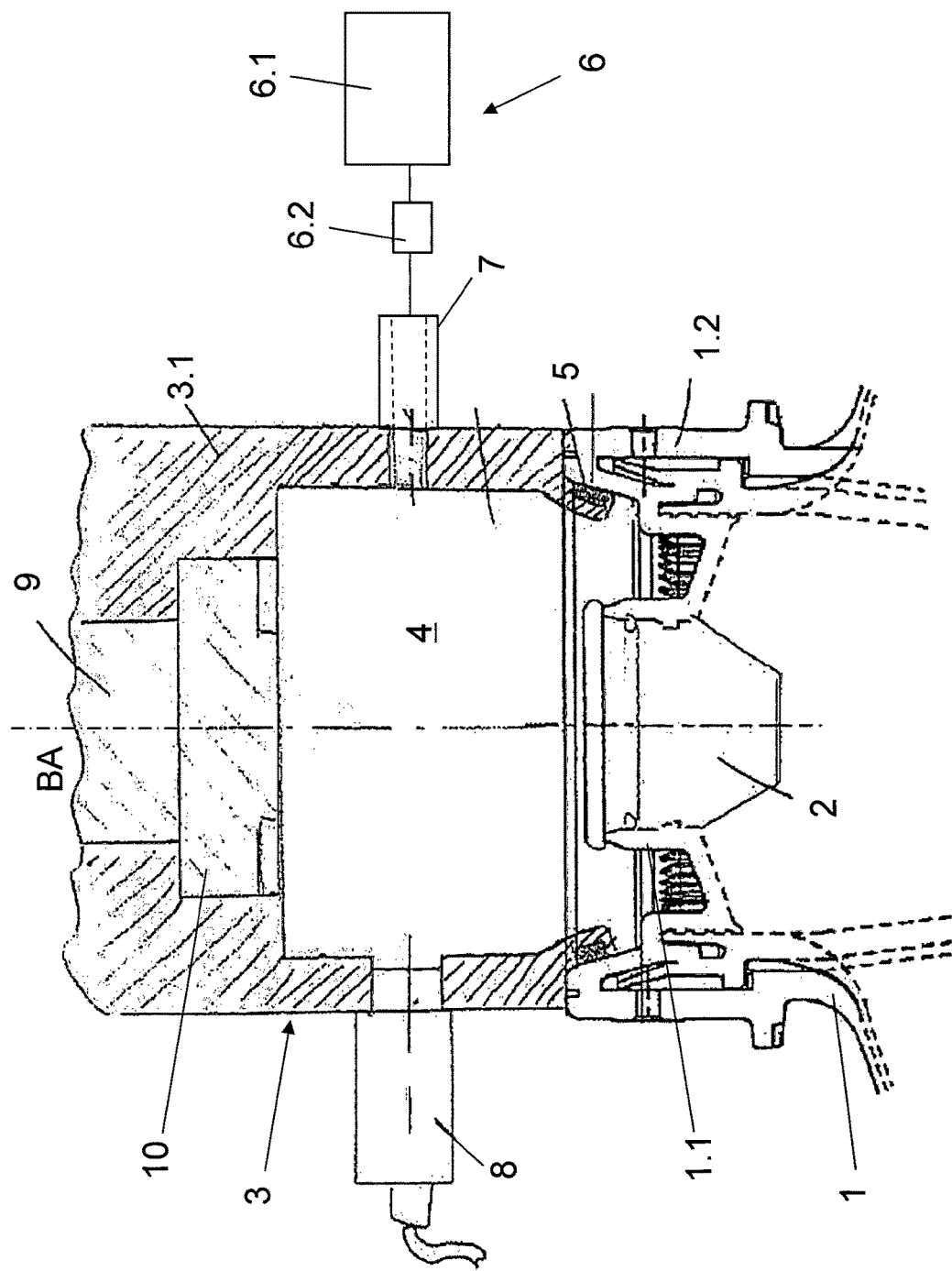

METHOD AND DEVICE FOR TESTING THE TIGHTNESS OF LARGE-VOLUME CONTAINERS

RELATED APPLICATIONS

Under 35 USC 371, this application is the national stage of international application PCT/EP2014/00590, filed on Mar. 7, 2014, which claims the benefit of the Apr. 23, 2013 filing date of German application DE 10-2013-006-943.2, the contents of which are herein incorporated by reference.

FIELD OF INVENTION

The invention relates to container processing, and in particular, to testing integrity of a container.

BACKGROUND

The primary purpose of a container is to contain. When a container fails to do so, the result is unpleasant for the consumer. This is particularly true when the container contains a liquid. In that case, any leak in the container may cause spillage. Conversely, any leak enables microorganisms to enter.

In the case of carbonated beverages, any leak will tend to cause the beverage to go flat. If the leak is a slow one, the consumer may not even know that there was a leak. In that case, a consumer may be prompted to avoid future purchase of a particular brand under the false assumption that drinks sold under that brand are insufficiently carbonated, even though the consumer's experience may have been based on anomalous product sample.

Of particular concern are leaks in large volume containers such as beer kegs. A beer keg is often a centerpiece at a party. Flat beer at such a party will tend to not only spoil the party atmosphere but impart a negative impression to many people under the most unfavorable circumstances.

Accordingly, once a container has been filled, it is useful to confirm that the container does not have any sort of slow leak before releasing it to market.

SUMMARY

An object of the invention is to provide a method that allows effective and reliable testing of the tightness of large-volume containers filled with a filling substance and closed with a valve or fitting.

As used herein, a large-volume container is a barrel-like container that is sometimes called a "keg." These are made of metal or plastic, for example PET and have a container interior that is closed by a valve or fitting that, in particular in plastic kegs, is only attached to the container after the container has been filled. Large-volume or barrel-like containers also include single-use plastic kegs.

A method according to the invention provides a fast and reliable way to test the tightness of valves of such containers as well as to test for leakage in the area around the container mouth. In particular, methods according to the invention make secure leak detection possible by causing a high pressure difference between a container's interior and a pressure in a testing chamber in which at least one sensor element is arranged.

The testing chamber is usually formed inside a bell-shaped test head that, for the test, is placed on the outside of the container in a region of its valve or container opening. During pressurization of the testing chamber with a reduced pressure or vacuum, the test head is sealed tightly against the container.

In one aspect, the invention features a method for testing tightness of container that is filled with filling substance and that is closed with a valve. Such a method includes placing a bell-shaped test head over a mouth of the container, sealing the container against the test head, accommodating at least a portion of the container in a testing chamber within the test head, increasing a pressure difference between a pressure within the testing chamber and an internal pressure of the container, identifying evidence of matter exiting the container and entering the testing chamber, wherein the evidence comprises one of emergence of filling substance into the testing chamber and foaming of the filling substance in the testing chamber, and in response to identifying the evidence, providing a signal indicative of the data indicative of a leak. Identifying evidence of matter exiting the container and entering the testing chamber includes using a camera to monitor at least one of the region of the container and the testing chamber for the evidence.

Some practices of the invention further include using a pressure sensor to monitor pressure in the testing chamber.

Other practices include increasing a pressure difference between a pressure within the testing chamber and an internal pressure of the container. These practices include doing so by connecting the testing chamber to a source of reduced pressure, by reducing a volume of the container, by exerting an influence on the filling substance, and by any combination of the foregoing. Ways of exerting such an influence, all of which are within the scope of the invention, include applying energy to the filling substance, applying heat to the filling material, applying ultrasound to the filling material, agitating the container, triggering release of dissolved gas from the filling substance, and any combination thereof.

In some practices, identifying evidence of matter exiting the container and entering the testing chamber also includes using a pressure sensor to detecting a change in pressure in the testing chamber during a test period.

In another aspect, the invention features an apparatus for testing tightness of container that is filled with filling substance and that is closed with a valve. Such an apparatus includes a bell-like test head configured for placement on the container in a region of the valve. The bell-like test head includes a testing chamber and is configured to accommodate the container in the region of a container sleeve thereof and the valve. The testing chamber connects to a pressure source. The apparatus further includes a camera in optical communication with the testing chamber of the test head and oriented towards the container in the region of the valve.

Other embodiments include a pressure sensor on the test head for detecting pressure in the testing chamber.

As used herein, expressions such as "substantially" or "approximately" mean deviations from a precise value by ±10%, preferably by ±5%, and/or deviations in the form of changes insignificant to function.

DESCRIPTION OF THE FIGURE

These and other features of the invention will be apparent from the following detailed description and the accompanying FIGURE, which shows a test head coupled to a keg.

DETAILED DESCRIPTION

The FIGURE shows a bell-shaped test head 3. The test head 3 is used to attempt to cause matter to leak out of a keg 1 that has been filled with a filling substance and that has been closed with a valve 2. This provides a way to test the fitting at the container's mouth for any leakage and to assess its overall tightness of fit. In the illustrated embodiment, the container 1 is a keg. However, the container can also be a barrel.

The testing procedure begins with placing the test head 3 on the container 1 so that it couples to the container's mouth. The container 1 is accommodated in a testing chamber 4 of the test head 3. An annular seal 5 seals the testing chamber 4 from the environment. The annular seal 5 lies against an inner face of an annular container sleeve 1.2 that surrounds the valve 2 and a valve ring 1.1 that protects the valve 2.

The next step is to create a pressure difference between the pressure in the testing chamber 4 and the inner pressure of the container 1. This can be carried out by evacuating the testing chamber 4 via a vacuum connection 7 connected to a vacuum device 6. The vacuum device 6 includes a vacuum source 6.1 and a control valve 6.2 that controls flow along the vacuum connection 7. The term "vacuum source" includes low-pressure sources generally. There is no requirement for a perfect vacuum. The term "low pressure" is intended to mean air pressure that is lower than ambient pressure.

A pressure sensor 8 on the test head 3 monitors the pressure in the testing chamber 4. Depressurization of the testing chamber 4 continues until an adequate pressure difference exists between an interior of the container 1 and the testing chamber 4. Upon reaching the pressure difference, the control valve 6.2 blocks the connection to the vacuum source 6.1.

If a leak is present in either the container 1 or the valve 2, filling substance should emerge into the testing chamber 4 during the test. A camera 9 arranged behind a window fitted with a glass pane 10 detects the presence of any such filling substance. The camera 9 has an optical axis that is coaxial with the axis BA of the container 1 or the valve 2. As a result, the camera 9 monitors that region of the container 1 that is arranged in the testing chamber 4.

In many cases, the filling substance has a tendency to foam. This is often the case with drinks that contain $CO_2$, and in particular, beer. The presence of foam is conspicuous and easily monitored by the camera 9. The emergence of filling substance into the testing chamber 4 or the presence of foam, both of which the camera 9 detects, indicates a leak. If the camera 7 does not detect emergent filling substance and/or foaming, the container 1 and its valve 2 are regarded as fitting together with sufficient tightness.

Another indicator of a leak is a disturbance in the pressure within the testing chamber 4 as gas from the container leaks into the testing chamber 4 from the container 1. Such incoming gas raises the pressure in the testing chamber 4. The pressure sensor 8 detects this rise in pressure.

In those embodiments that use the pressure sensor 8 for this purpose, the testing chamber 4 is depressurized for a predefined period. After this period, the testing chamber 4 is separated from the reduced pressure source 6.1. Then, for a subsequent time period, the pressure sensor 8 monitors the testing chamber 4 for any rise in pressure.

The testing procedure relies on having a high pressure-difference between the interior of the container 1 and the testing chamber 4. One way to create this pressure difference is by depressurizing the testing chamber 4 with a reduced pressure source 6.1. Another way to create this pressure difference is to increase the container's internal pressure instead. This can be carried out by imposing external influences on the container 1, on the filling substance in the container 1, or on both.

An alternative testing procedure that relies on raising the container's internal pressure begins by first setting the pressure in the testing chamber 4 to some reference value. This can be any value. Examples include atmospheric or ambient pressure, as well as some reduced pressure, as was the case with the first testing procedure.

Next, one causes an external influence on the container 1 or the filling substance. This can be carried out in widely varying ways. One example is to exert a force on the container 1 to cause controlled elastic deformation of the container's wall, thus temporarily reducing the container's volume. This causes a rise in the container's internal pressure. Alternatively, one can apply ultrasound or heat to the filling contents. In the case of CO2-containing filling substances, this triggers emergence of CO2 gas from the filling substance, which in turn raises the container's internal pressure. Another possibility is to agitate the container 1. This also triggers release of dissolved $CO_2$ and hence raises the container's internal pressure.

The remainder of the test is carried the same way as described earlier.

The two methods described above may be used in the alternative or together. Each of these methods may also be carried out repeatedly during the test.

The invention has been described above with reference to exemplary embodiments. It is evident that numerous changes and derivations are possible without leaving the inventive concept on which the invention is based.

The invention claimed is:

1. A method comprising causing matter to leak out of a container that has been closed with a valve by placing a bell-shaped test head over a mouth of said container, sealing said container against said bell-shaped test head, accommodating at least a portion of said container in a testing chamber within said test head, and causing an increase in a pressure difference between a pressure that is within said testing chamber and an internal pressure that is within said container, using a camera that is separated from said testing chamber by a pane through which said camera is pointed to see into said test chamber to monitor at least one of a region of said container and said test chamber, while monitoring said at least one of said region of said container and said test chamber, identifying one of evidence of matter having emerged into said testing chamber and evidence of matter having undergone foaming in said testing chamber, each of which is indicative of matter that has been caused to leak out of said container and that has, subsequent to having exited said container, entered said testing chamber, and, in response to having identified said one of evidence of matter having emerged into said testing chamber and evidence of matter having undergone foaming in said testing chamber, providing a signal indicative of a leak in said container, wherein causing said increase in said pressure difference comprises connecting said test chamber to a source of reduced pressure, and wherein said container is selected from the group consisting of a keg and a barrel.

2. The method of claim 1, further comprising causing controlled elastic deformation of a wall of said container.

3. The method of claim 1, further comprising agitating said container.

4. The method of claim 1, further comprising raising pressure within said container and lowering pressure within said testing chamber.

5. The method of claim 1, further comprising aligning an optical axis of said camera to be coaxial with an axis of said valve.

6. The method of claim 1, further comprising applying energy to a filling substance inside said container.

7. The method of claim 1, further comprising, using a pressure sensor, detecting a change in pressure in said testing chamber during a test period.

8. The method of claim 1, further comprising identifying evidence of matter having undergone foaming in said testing chamber.

9. The method of claim 1, further comprising identifying evidence of matter having emerged into said testing chamber.

10. The method of claim 1, further comprising causing ultrasound to propagate within said container.

11. The method of claim 1, further comprising aligning an optical axis of said camera to be coaxial with an axis of said container.

12. The method of claim 1, further comprising causing gas that has been dissolved in a liquid filling substance within said container to be released from said filling substance.

13. The method of claim 1, wherein said source of reduced pressure is a vacuum source.

14. The method of claim 1, further comprising causing a control valve to block a connection between said reduced pressure and said vacuum source.

15. The method of claim 1, wherein said matter comprises liquid filling substance from inside said container.

16. The method of claim 1, further comprising depressurizing said testing chamber for a predefined period, separating said pressure chamber from said source of reduced pressure, and, while said pressure chamber is separated from said source of reduced pressure, causing said pressure sensor to monitor said testing chamber for any rise in pressure.

17. The method of claim 1, further comprising sealing said testing chamber with an annular seal that lies against an inner face an annular container sleeve, wherein said annular sleeve surrounds a valve ring, wherein said valve ring surrounds said valve.

18. An apparatus for causing filling substance to leak out of a container that has been filled with said filling substance and that has been closed with a valve, said apparatus comprising a bell-like test head that is configured for placement on said container in a region of said valve to accommodate said container in a region of a sleeve thereof and said valve, said bell-like test head comprising a test chamber configured to be connected to a source of reduced pressure, wherein said bell-like test head is configured for accommodating at least a portion of said container in said test chamber within said test head, a pressure sensor disposed on said test head for monitoring pressure in said test chamber during depressurization of said test chamber, said depressurization causing an increase in a pressure difference between said pressure that is within said test chamber and an internal pressure that is within said container, a pane oriented towards said container, and a camera in optical communication with said test chamber through said pane, said camera being configured for identifying one of evidence of matter having emerged into said test chamber and evidence of matter having undergone foaming in said test chamber, each of which is indicative of matter that has been caused to leak out of said container and that has, subsequent to having exited said container, entered said test chamber and, in response to having identified said one of evidence of matter having emerged into said test chamber and said evidence of matter having undergone foaming in said test chamber, providing a signal indicative of a leak in said container, wherein said container is selected from the group consisting of a keg and a barrel.

* * * * *